United States Patent
Jiang-Hafner

(10) Patent No.: US 6,411,066 B1
(45) Date of Patent: Jun. 25, 2002

(54) METHOD TO CONTROL THE FLOW OF ACTIVE POWER IN A HIGH VOLTAGE DIRECT CURRENT TRANSMISSION SYSTEM AND DEVICE FOR THE SAME

(75) Inventor: Ying Jiang-Hafner, Ludvika (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/784,440

(22) PCT Filed: Jun. 27, 2000

(86) PCT No.: PCT/EP00/05990

§ 371 (c)(1),
(2), (4) Date: Apr. 19, 2001

(87) PCT Pub. No.: WO01/03268

PCT Pub. Date: Jan. 11, 2001

(30) Foreign Application Priority Data

Jul. 1, 1999 (EP) .............................. 99112542

(51) Int. Cl.$^7$ ................................. G05F 1/70
(52) U.S. Cl. ....................................... 323/207
(58) Field of Search ................ 323/205, 207; 363/35

(56) References Cited

U.S. PATENT DOCUMENTS 4,320,444 A * 3/1982 Hausler et al. ............... 363/35
5,666,275 A * 9/1997 Inokuchi et al. .............. 363/35
6,115,269 A * 9/2000 Gunnarsson et al. .......... 363/35

FOREIGN PATENT DOCUMENTS

| DE | 195 44 777 | 12/1996 |
|----|------------|---------|
| EP | 0 762 624 | 3/1997 |
| WO | WO 94/22199 | 9/1994 |
| WO | WO 96/15573 | 5/1996 |

* cited by examiner

*Primary Examiner*—Adolf Deneke Berhane
(74) *Attorney, Agent, or Firm*—Oblon, Spivak, McClelland, Maier & Neustadt, P.C.

(57) ABSTRACT

A high voltage direct current transmission system has a first and a second converter station coupled to each other via a direct current link, each converter station with a voltage source converter. The first converter station has a first voltage sensing device for sensing its direct voltage, and a voltage controller for control of its direct voltage. The second converter station has an active power controller for control of its active power flow in dependence on a reference value therefor. The voltage controller controls the direct voltage of the first converter station in dependence on only a sensed instantaneous value of the direct voltage and a first voltage reference value therefor, for a voltage control that is independent of the flow of active power through the first converter. The second converter station includes a second voltage device for sensing its direct voltage. The power controller includes a voltage control for control of the direct voltage of the second converter station in dependence on a sensed instantaneous value thereof and a second voltage reference value, the second voltage reference value being formed in dependence on a third voltage reference value and on a voltage reference correction signal formed in dependence on a quantity indicative of the active power flow through the second converter station and the reference value therefor.

24 Claims, 2 Drawing Sheets

METHOD TO CONTROL THE FLOW OF ACTIVE POWER IN A HIGH VOLTAGE DIRECT CURRENT TRANSMISSION SYSTEM AND DEVICE FOR THE SAME

TECHNICAL FIELD

The invention relates to a method for controlling active power flow in a high voltage direct current transmission system having a first and a second converter station coupled to each other via a direct current link, each converter station with a voltage source converter, wherein the first converter station controls the voltage of the direct current link, at the first converter station, in dependence on a first voltage reference value, and the second converter station controls the active power flow through the second converter station, and to a high voltage direct current transmission system for carrying out the method.

BACKGROUND ART

For a general description of control systems for voltage source converters reference is made to Anders Lindberg: PWM and Control of Two and Three Level High Power Voltage Source Converters. Royal Institute of Technology, Department of Electric Power Engineering. Stockholm 1995, in particular pages 1, 77–104, and appendix A.

FIG. 1 shows in the form of a schematic single line and block diagram a high voltage direct current transmission system as known in the prior art. A first and a second converter station STN1 and STN2 respectively, are coupled to each other via a direct current (dc) link having two pole conductors W1 and W2 respectively. The pole conductors are typically cables but may also at least to a part be in the form of overhead lines. Each converter station has a capacitor equipment, in this embodiment schematically shown as capacitors C1 and C2 respectively, coupled between the pole conductors, and comprises a voltage source converter, CON1 and CON2 respectively. Each converter comprises two three-phase groups of semiconductor valves in six-pulse bridge connections The semiconductor valves comprises, in a way known per se, branche of gate turn on/turn off semiconductor elements, for example power transistors of so-called IGBT-type, and diodes in anti-parallel connection with these elements.

Each converter is via phase inductors, PI1 and PI2 respectively, coupled to a respective three-phase alternating current (ac) electric power network, N1 and N2. Although not shown in the figure, it is well known in the art that the converters may be coupled to the three-phase networks via transformers, in which case the phase inductors in some cases may be omitted. Filter equipment F1 and F2 respectively is coupled in shunt connection at connection points between the phase inductors and the three-phase networks.

The ac-voltage of the alternating current network N1 at the connection point of the filter F1 is designated UL1 and is sensed with a sensing device M1. The ac-current at the converter CON1 is designated Iv1 and is sensed with a measuring device M2. Similarly, the ac-voltage at the connection point of the filter F2 is designated UL2 and is sensed with a sensing device M3, and the ac-current at the converter CON2 is designated Iv2 and is sensed with a measuring device M4.

The dc-voltage across the capacitor equipment C1 is designated Udc1 and is sensed with an only symbolically shown sensing device M5, and the dc-voltage across the capacitor equipment C2 is designated Udc2 and is sensed with an only symbolically shown sensing device M6.

The first converter station comprises control equipment CTRL1 and the second converter station control equipment CTRL2 of similar kind.

The control equipments operate in a conventional way with three phase units (voltages and currents) converted to and expressed in a two-phase αβ-reference frame as well as in a rotating two-phase dq-reference frame. The phases of the three-phase alternating current electric power networks are referred to as the abc-reference frame. Vector units are in the following illustrated with a dash on top ($\bar{x}$). In the following text and in the figures the reference frame is, where appropriate, indicated in an upper index (for example $x^{dq}$).

Control equipment CTRL1 comprises a dc-voltage controller UdcREG, an ac-voltage controller UacREG, selector means SW1 and SW2 respectively, and an internal converter current control IREG.

The dc-voltage controller is supplied with the sensed dc-voltage Udc1 and a first voltage reference value Udc1R thereof, and forms in dependence of the deviation of the actual value Udc1 and the first voltage reference value Udc1R an output signal P1C.

The ac-voltage controller is supplied with the sensed ac-voltage UL1 and a voltage reference value UL1R thereof, and forms in dependence of the deviation of the actual value UL1 and the reference value UL1R an output signal Q1C.

Each of the dc-voltage controller and ac-voltage controller comprises a (not shown) difference forming member, forming the deviation between respective reference values and actual values, which deviation is supplied to and processed in a (not shown) controller member having for example a proportional/integrating characteristic. The voltage controllers thus provide feedback control of the respective voltages.

The output signal P1C and a reference value P1R for the active power flow through the converter CON1 are supplied to two different inputs on the selector means SW1, and the output signal Q1C and a reference value Q1R for the reactive power flow through the converter CON1 are supplied to two different inputs on the selector means SW2. The reference values P1R and Q1R may be set manually, in particular the reference value P1R may also be the output of another controller such as a frequency controller.

In dependence on a first mode signal MD11 either of the output signal P1C and the reference value P1R is transferred and supplied to the internal converter current control IREG in the form of a signal designated $p_{ref1}$, having the significance of an active power order.

In dependence on a second mode signal MD21 either of the output signal Q1C and the reference value Q1R is transferred and supplied to the internal converter current control IREG in the form of a signal designated $q_{ref1}$, having the significance of a reactive power order.

Thus, each converter station can operate in four different modes, one of dc-voltage control and active power control and one of ac-voltage control and reactive power control. Usually, one of the converter stations, for example the first one, operates under dc-voltage control, whereas the second converter station (as well as other, not shown, converter stations, which may be coupled to the first converter station via other direct current links) operates under active power control and under ac-voltage or reactive power control.

The operation modes are set either manually by an operator, or, under certain conditions, automatically by a not shown sequential control system.

The internal converter current control IREG is of a kind known per se and comprises a current-order calculating unit and a converter control unit (not shown).

The current-order calculating unit comprises a current-order calculating member and a current limiting member. The above mentioned active and reactive power order signals, $p_{ref1}$ and $q_{ref1}$ respectively, are supplied to the current-order calculating unit. In the current-order calculating member current reference values, expressed in the dq-reference frame as $i_{ref}^d$ and $i_{ref}^q$ respective, are calculated in dependence on the power orders. The calculation is performed according to the per se known relations $$p_{ref} = u^d i_{ref}^d + u^q i_{ref}^q$$

$$q_{ref} = u^d i_{ref}^q - u^q i_{ref}^d$$

wherein the voltages $u^d$ and $u^q$ represent voltages sensed in the alternating current network and transformed to the dq-reference frame in a manner known per se. The current reference values $i_{ref}^d$ and $i_{ref}^q$ are supplied to the current limiting member and therein limited, as the case may be, in accordance with specified operating conditions for the transmission system. The current limiting member outputs the so limited values as a current vector $\bar{i}_{ref}^{xdq}$ to the converter control unit.

The converter control unit has an inner ac-current control feed back loop which, in dependence on the supplied current vector $\bar{i}_{ref}^{xdq}$ and a phase reference signal, generates a voltage reference vector. This voltage reference vector is supplied to a pulse-generating member that in dependence thereon generates a train Fp1 of turn on/turn off orders supplied to the semiconductor valves according to a predetermined pulse width modulation pattern. The phase reference signal is in a conventional manner generated by a phase locked loop and at least under steady state conditions locked to the phase of the filter bus voltage of the alternating current electric power network.

Control equipment CTRL2 in the second converter station is similar to control equipment CTRL1 described above, only, in FIG. 1, index 1 for the various signals is at appropriate occasions changed to index 2.

As mentioned above, usually one of the converter stations, for example the first one, operates under dc-voltage control, controlling the dc-voltage of the dc-link at that converter station, whereas the second converter station operates under active power control and under ac-voltage or reactive power control. The converter station operating under dc-voltage control then has an active power slack function, providing the active power requested by the second converter station and maintaining the dc-voltage at the desired value. However, certain disturbances in the power networks and in the transmission system, in particular transient disturbances in the alternating current electric power network to which the dc-voltage controlling converter station is coupled, for example phase to ground faults, may result in considerable dc-voltage variations on the direct current link. In such cases, the first converter station may not be able to balance the active power required by the second converter station. Such variations may reach such a magnitude that they would lead to a shut down of the dc transmission system, such as a temporary blocking of the converter station by an over current protection or by an over- or under voltage protection, if no measures were taken. One such measure is to temporarily change the operating mode of the second converter station to dc-voltage control mode in order to keep the dc-transmission system in operation. When the disturbance is cleared, the operating mode of the second converter should then again be changed to active power control mode in order to recover the active power flow to the pre-fault level. Such mode changes to dc-voltage control mode have to be done very fast in order to avoid dc over voltages on the dc-link. Furthermore, to determine the time at which a change back to active power control mode may be accomplished requires in practice intervention of the operator of the dc transmission system and communication between the converter stations.

SUMMARY OF THE INVENTION

The object of the invention is to provide a method of the kind described in the introduction, which eliminates the above mentioned disadvantages related to change of operating modes as known in the prior art, and a high voltage direct current transmission system for carrying out the method. In particular it is an object of the invention to provide a method, and a high voltage direct current transmission system, which permit a smooth transition between dc-voltage control and active power control modes of the converter station.

According to the invention, this object is accomplished by having both the first and the second converter stations operating in dc voltage control mode, the first converter station having means for control of the voltage of the direct current link in dependence on a first voltage reference value and the second converter station having means for control of the active power flow through the second converter station, which means comprises voltage control means for control of the direct voltage of the second converter station in dependence on a second voltage reference value, said second voltage reference value being formed in dependence on a third voltage reference value and on a voltage reference correction signal formed in dependence on a quantity indicative of the active power flow through the second converter station and a reference value thereof.

In an advantageous development of the invention, the means for control of the active power flow through the second converter station comprises controller means for forming said voltage reference correction signal, having as inputs said quantity indicative of the active power flow through the second converter station and said reference signal thereof, and summing means for forming said second voltage reference value as a sum of said voltage reference correction signal and said third voltage reference value.

In another advantageous development of the invention, said quantity indicative of the active power flow through the second converter station is the active power flow through the second converter station, calculated from measurements of voltages and currents in the alternating current network to which the second converter station is coupled.

Other advantageous developments of the invention will become clear from the following description and from the claims.

With the invention the dc-voltage variations in the transmission system during a disturbance will be reduced and the power recovery process after a disturbance will be simplified and faster. In particular the need for a communication system between the converter stations may be eliminated, such systems being quite complicated especially in multi-terminal systems.

BRIEF DESCRIPTION OF THE DRAWINGS

The invention will be explained in greater detail by description of embodiments with reference to the accompanying drawings, which are all schematic and in the form of single line diagrams and block diagrams respectively, and wherein.

DESCRIPTION OF THE PREFERRED EMBODIMENTS

The following description relates both to the method and to the high voltage direct current transmission system, and the block diagrams can thus be regarded both as signal flow diagrams and block diagrams of control equipment for the transmission system. The functions to be performed by the blocks shown in the block diagrams may in applicable parts be implemented by means of analogue and/or digital technique in hard-wired circuits, or as programs in a microprocessor. It shall also be understood that although the in the figures shown blocks are mentioned as members, filters, devices etc. they are, in particular where their functions are implemented as software for a microprocessor, to be interpreted as means for accomplishing the desired function. Thus, as the case may be, the expression "signal" can also be interpreted as a value generated by a computer program and appearing only as such. Only functional descriptions of the blocks are given below as these functions can be implemented in manners known per se by persons skilled in the art.

In order not to weigh the description with for the person skilled in the art obvious distinctions, usually the same designations are used for quantities that appear in the high voltage transmission system and for the measured values and signals/calculated values, corresponding to these quantities, that are supplied to and processed in the described control equipment.

Figure 1:
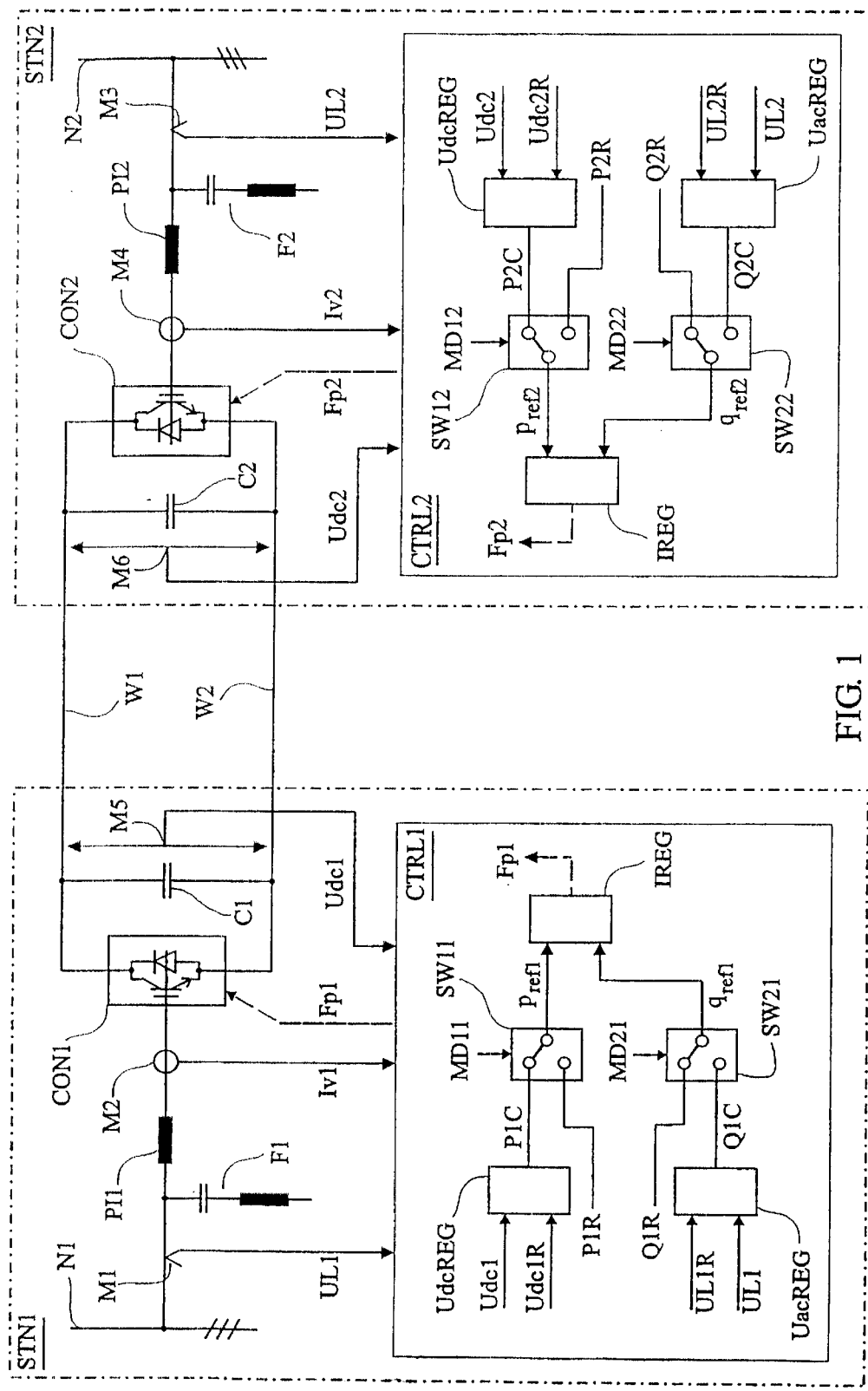
FIG. 1 shows a high voltage direct current transmission system as known in the prior art.
Figure 2:
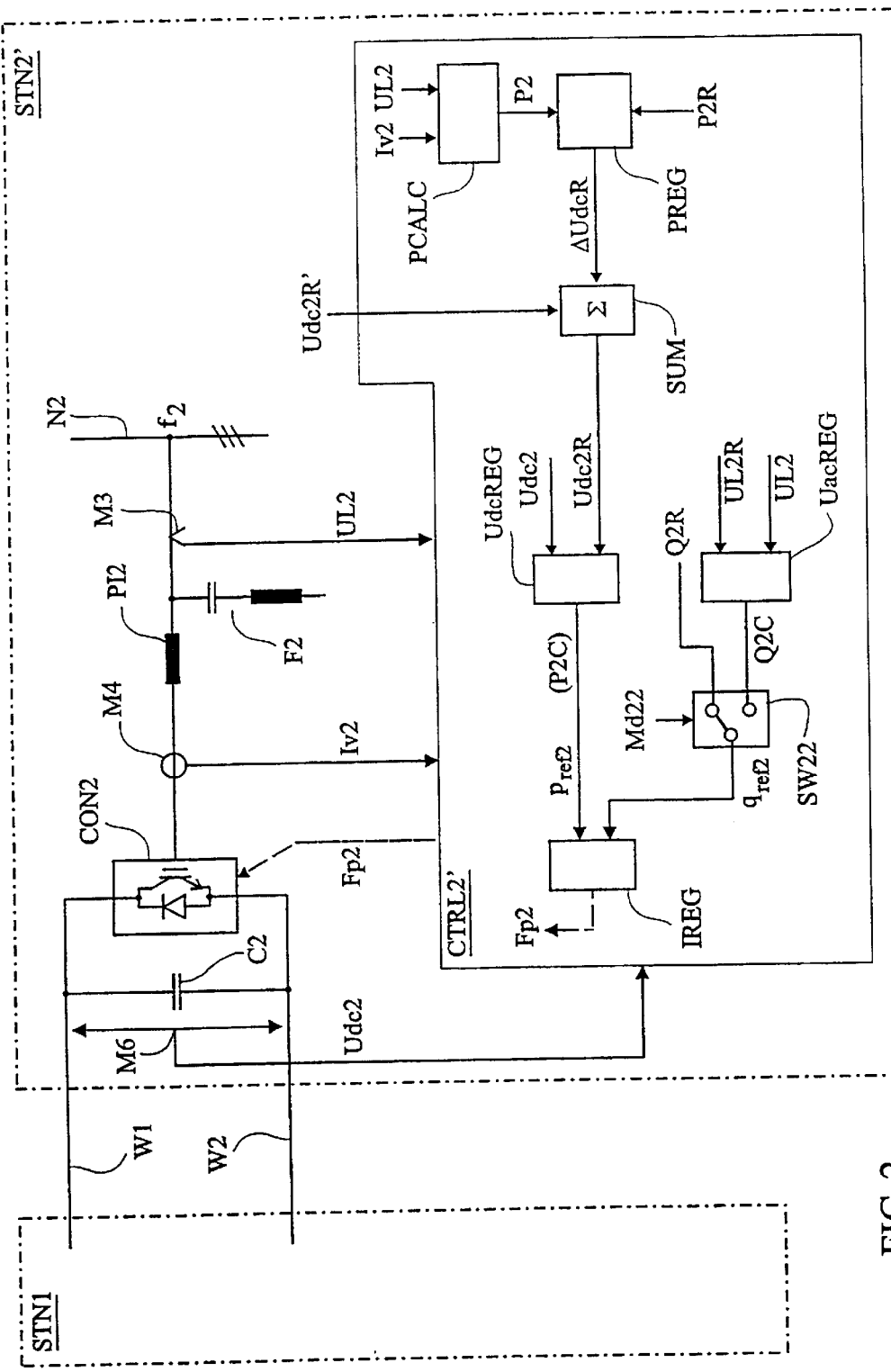
FIG. 2 shows control equipment according to the invention for a voltage source converter.

FIG. 2 shows in the form of a schematic single line and block diagram a high voltage direct current transmission system of similar kind as the one described with reference to FIG. 1, but with control equipment of the second converter station in accordance with the invention. The second converter station is in FIG. 2 designated as STN2', and its control equipment as CTRL2', otherwise same designation numbers refer to parts of similar kind in both figures. For the sake of convenience, the details of the converter station STN1 are not shown in FIG. 2.

According to the invention both the first and the second converter station operates in dc-voltage control mode. Control equipment CTRL2' comprises an internal converter current control IREG as described in connection with FIG. 1. The internal converter current control receives as inputs a signal designated $p_{ref2}$, having the significance of an active power order and being the output of the dc-voltage controller UdcREG, and a signal designated $q_{ref2}$, having the significance of a reactive power order. The signal $q_{ref2}$ is one of the output Q2C of the ac-voltage controller UacREG and a reference value Q2R for the reactive power flow through the converter CON2. The values Q2C and Q2R are selectable via the selector means SW2 in dependence on a second mode signal MD22. The dc-voltage of the second converter station is controlled in dependence on a second voltage reference value Udc2R. Still in accordance with the invention the second voltage reference value is formed in dependence on a third voltage reference value Udc2R' and on a voltage reference correction signal ΔUdcR, the forming of which will be explained below.

An active power controller PREG has as inputs a quantity P2 indicative of the actual value of the active power flow through the second converter station and a reference value P2R thereof, and outputs in dependence of a deviation between these inputs the voltage reference correction signal ΔUdcR. The voltage reference correction signal and the third voltage reference value Udc2R' are supplied to a summing means SUM, which forms the second voltage reference value Udc2R as the sum of its inputs.

The active power controller comprises in a conventional way a (not shown) difference forming member, forming the deviation between the reference value and the actual value, which deviation is supplied to and processed in a (not shown) controller member, having for example a proportional/integrating characteristic, thus providing feedback control of the active power flow through the second converter station. Thus, the active power controller forms a voltage reference correction signal thereby adjusting the dc-voltage of the second converter station to a value that results in the desired active power flow through the converter.

At a voltage disturbance as described above, causing the voltage control of the direct current link as performed by the first converter station to be out of order, the voltage at the second converter station will be maintained by the voltage control of the second converter station. As soon as the fault is cleared, the first converter station again establishes the voltage control of the direct current link at the first converter station. The second converter station will then automatically return to active power control to reach the active power operating point that existed before the disturbance.

In a preferred embodiment of the invention, the quantity P2 indicative of the actual value of the active power flow through the second converter station, is calculated in a calculating member PCALC in dependence on sensed values of the filter bus voltage UL2 and the ac-current Iv2 flowing through the converter. The calculation is preferably performed with the sensed ac-quantities transformed into the αβ-reference frame and according to the per se well known relation $p = u_\alpha i_\alpha + u_\beta i_\beta$.

In particular during transient conditions where the active power is not under control, it is important to limit the output signal of the active power controller, that is the voltage reference correction signal ΔUdcR. In another preferred embodiment of the invention the third voltage reference value Udc2' is set equal to the first voltage reference value Udc1R of the first converter station. This means that the voltage reference correction signal ΔUdcR at least theoretically will be zero when the active power reference value P2R is set to zero, and that its absolute value will reach its maximum when the active power reference value is set at a maximum value. Consequently, with knowledge of the resistance of the direct current link, the limitation values of the output of the active power controller can easily be defined.

In a case where the network N2 has only limited active power generating facilities, the quantity indicative of the actual value of the active power flow through the second converter station may also be the actual frequency $f_2$ as sensed in the network N2, and the reference value thereof be a frequency reference value $f_2R$.

Although the invention is described in connection with a two-terminal system, it is also applicable to multi-terminal transmission systems, where more than one converter station is coupled to the voltage controlling converter station and operates in an active power control mode, as well as to back-to-back systems.

The actual value of the active power may of course also be obtained in other per se known ways.

What is claimed is:

1. A high voltage direct current transmission system comprising:

first and second converter stations coupled to each other via a direct current link, each converter station having a voltage source converter, the first converter station having first voltage sensing means for sensing a first direct voltage, and voltage control means for controlling the first direct voltage, the second converter station having active power control means for controlling an active power flow based on a reference value, wherein:

the voltage control means controls the first direct voltage of the first converter station based on only a sensed instantaneous value of said first direct voltage and a first voltage reference value therefor, for a voltage control that is independent of a flow of active power through the first converter;

the second converter station comprises second voltage sensing means for sensing a second direct voltage;

the power control means of the second converter station comprises voltage control means for controlling the second direct voltage of the second converter station based on a sensed instantaneous value thereof and a second voltage reference value; and said second voltage reference value is formed based on a third voltage reference value and on a voltage reference correction signal formed based on a quantity indicative of the active power flow through the second converter station and the reference value therefor.

2. A direct current transmission system as claimed in claim 1, wherein the means for controlling the second converter station comprises:

controller means for forming said voltage reference correction signal, and having as inputs said quantity indicative of the active power flow through the second converter station and said reference signal therefor; and summing means for forming said second voltage reference value as a sum of said voltage reference correction signal and said third voltage reference value.

3. A direct current transmission system as claimed in claim 1, wherein said quantity indicative of the active power flow through the second converter station is an active power flow through the second converter station.

4. A direct current transmission system as claimed in claim 1, wherein the means for controlling the active power flow through the second converter station comprises calculating means for calculating said quantity indicative of the active power flow through the second converter station from measurements of voltages and currents in an alternating current network to which the second converter station is coupled.

5. A direct current transmission system as claimed in claim 1, wherein said quantity indicative of the active power flow through the second converter station is a frequency of an alternating current network to which the second converter station is coupled.

6. A direct current transmission system as claimed in claim 1, wherein said third voltage reference value is equal to the first voltage reference value.

7. A method for controlling an active power flow using a high voltage direct current transmission system having first and second converter stations coupled to each other via a direct current link, each converter station having a voltage source converter, the first converter station having first voltage sensing means for sensing a first direct voltage, and voltage control means for controlling the first direct voltage, the second converter station having second voltage sensing means for sensing a second direct voltage, and active power control means for controlling an active power flow based on a reference value therefor, said method comprising:

controlling the first direct voltage of the first converter station based on only a sensed instantaneous value of said first direct voltage and a first voltage reference value therefor, independent of a flow of active power through the first converter, controlling the second direct voltage of the second converter station based on a second voltage reference value for the direct voltage of the second converter station, and forming said second voltage reference value based on a third voltage reference value and on a voltage reference correction signal formed based on a quantity indicative of the active power flow through the second converter station and the reference value therefor.

8. A method as claimed in claim 7, wherein said quantity indicative of the active power flow through the second converter station and said reference signal therefor are supplied to a controller means for forming as an output of said controller means said voltage reference correction signal, and said second voltage reference value is formed as a sum of said voltage reference correction signal and said third voltage reference value.

9. A method as claimed in claim 7, wherein said quantity indicative of the active power flow through the second converter station is an active power flow through the second converter station.

10. A method as claimed in claim 7, wherein said quantity indicative of the active power flow through the second converter station is calculated from measurements of voltages and currents in an alternating current network to which the second converter station is coupled.

11. A method as claimed in claim 7, wherein said quantity indicative of the active power flow through the second converter station is a frequency of an alternating current network to which the second converter station is coupled.

12. A method as claimed in claim 7, wherein said third voltage reference value is equal to the first voltage reference value.

13. A high voltage direct current transmission system comprising:

first and second converter stations coupled to each other via a direct current link, each converter station having a voltage source converter, the first converter station having a first voltage sensor configured to sense a first direct voltage, and a voltage controller configured to control the first direct voltage, the second converter station having an active power controller configured to control an active power flow based on a reference value, wherein:

the voltage controller controls the first direct voltage of the first converter station based on only a sensed instantaneous value of said first direct voltage and a first voltage reference value therefor, for a voltage control that is independent of a flow of active power through the first converter;

the second converter station comprises a second voltage sensor configured to sense a second direct voltage;

the power controller of the second converter station comprises a voltage controller configured to control the second direct voltage of the second converter station based on a sensed instantaneous value thereof and a second voltage reference value; and said second voltage reference value is formed based on a third voltage reference value and on a voltage reference correction signal formed based on a quantity indicative of the active power flow through the second converter station and the reference value therefor.

14. A direct current transmission system as claimed in claim 13, wherein the power controller of the second converter station comprises:

a controller configured to control said voltage reference correction signal, and having as inputs said quantity indicative of the active power flow through the second converter station and said reference signal therefor; and a summing mechanism configured to form said second voltage reference value as a sum of said voltage reference correction signal and said third voltage reference value.

15. A direct current transmission system as claimed in claim 13, wherein said quantity indicative of the active power flow through the second converter station is an active power flow through the second converter station.

16. A direct current transmission system as claimed in claim 13, wherein the power controller of the second converter station comprises a calculator configured to calculate said quantity indicative of the active power flow through the second converter station from measurements of voltages and currents in an alternating current network to which the second converter station is coupled.

17. A direct current transmission system as claimed in claim 13, wherein said quantity indicative of the active power flow through the second converter station is a frequency of an alternating current network to which the second converter station is coupled.

18. A direct current transmission system as claimed in claim 13, wherein said third voltage reference value is equal to the first voltage reference value.

19. A method for controlling an active power flow using a high voltage direct current transmission system having first and second converter stations coupled to each other via a direct current link, each converter station having a voltage source converter, the first converter station having a first voltage sensor configured to sense a first direct voltage, and a voltage controller configured to control the first direct voltage, the second converter station having a second voltage sensor configured to sense a second direct voltage, and an active power controller configured to control an active power flow based on a reference value therefor, said method comprising:

controlling the first direct voltage of the first converter station based on only a sensed instantaneous value of said first direct voltage and a first voltage reference value therefor, independent of a flow of active power through the first converter, controlling the second direct voltage of the second converter station based on a second voltage reference value for the direct voltage of the second converter station, and forming said second voltage reference value based on a third voltage reference value and on a voltage reference correction signal formed based on a quantity indicative of the active power flow through the second converter station and the reference value therefor.

20. A method as claimed in claim 19, wherein said quantity indicative of the active power flow through the second converter station and said reference signal therefor are supplied to a controller configured to form as an output of said controller said voltage reference correction signal, and said second voltage reference value is formed as a sum of said voltage reference correction signal and said third voltage reference value.

21. A method as claimed in claim 19, wherein said quantity indicative of the active power flow through the second converter station is an active power flow through the second converter station.

22. A method as claimed in claim 19, wherein said quantity indicative of the active power flow through the second converter station is calculated from measurements of voltages and currents in an alternating current network to which the second converter station is coupled.

23. A method as claimed in claim 19, wherein said quantity indicative of the active power flow through the second converter station is a frequency of an alternating current network to which the second converter station is coupled.

24. A method as claimed in claim 19, wherein said third voltage reference value is equal to the first voltage reference value.

* * * * *